(12) United States Patent
Hsu et al.

(10) Patent No.: US 11,081,717 B2
(45) Date of Patent: Aug. 3, 2021

(54) STORAGE MODULE OF DISTRIBUTED FLOW BATTERY

(71) Applicant: Institute of Nuclear Energy Research, Atomic Energy Council, Executive Yuan, R.O.C., Taoyuan (TW)

(72) Inventors: Ning-Yih Hsu, Taoyuan (TW); Chien-Hong Lin, Taoyuan (TW); Han-Wen Chou, Taoyuan (TW); Chin-Lung Hsieh, Taoyuan (TW); Yi-Hsin Hu, Taoyuan (TW); Yu-De Zhuang, Taoyuan (TW); Yun-Shan Tsai, Taoyuan (TW); Qiao-ya Chen, Taoyuan (TW)

(73) Assignee: Institute of Nuclear Energy Research, Atomic Energy Council, Executive Yuan, R.O.C., Taoyuan (TW)

(*) Notice: Subject to any disclaimer, the term of this patent is extended or adjusted under 35 U.S.C. 154(b) by 162 days.

(21) Appl. No.: 16/591,740

(22) Filed: Oct. 3, 2019

(65) Prior Publication Data
US 2021/0104769 A1    Apr. 8, 2021

(51) Int. Cl.
| H01M 8/242 | (2016.01) |
| H01M 8/0221 | (2016.01) |
| H01M 8/0226 | (2016.01) |
| H01M 8/0228 | (2016.01) |
| H01M 8/0247 | (2016.01) |
| H01M 8/1023 | (2016.01) |
| H01M 8/248 | (2016.01) |
| H01M 8/18 | (2006.01) |

(52) U.S. Cl.
CPC ......... *H01M 8/242* (2013.01); *H01M 8/0221* (2013.01); *H01M 8/0226* (2013.01); *H01M 8/0228* (2013.01); *H01M 8/0247* (2013.01); *H01M 8/1023* (2013.01); *H01M 8/248* (2013.01); *H01M 8/18* (2013.01)

(58) Field of Classification Search
CPC .................................................... H01M 8/242
See application file for complete search history.

(56) References Cited

U.S. PATENT DOCUMENTS

| 2003/0129459 A1* | 7/2003 | Ovshinsky | H01M 4/90 |
| | | | 429/9 |
| 2013/0022846 A1* | 1/2013 | Liu | H01M 4/96 |
| | | | 429/81 |

(Continued)

*Primary Examiner* — Brian R Ohara
(74) *Attorney, Agent, or Firm* — Demian K. Jackson; Jackson IPG PLLC

(57) ABSTRACT

A storage module of distributed flow battery is provided. An electrochemical reaction is processed with the positive and negative electrolytes to produce and/or discharge direct current and further output the positive and negative electrolytes after the reaction. The module comprises two end plates; two frames disposed between the two end plates; two current collectors disposed between the two frames; two complex cast polar plates disposed between the two current collectors; two electrodes disposed between the two complex cast polar plates; a membrane disposed between the two electrodes; and three gaskets. Therein, two of the gaskets are set to sandwich and enclose one of the two complex cast polar plates; and the other one of the gaskets is set between the other one of the two complex cast polar plates and an adjacent one of the current collectors.

7 Claims, 4 Drawing Sheets

(56) References Cited

U.S. PATENT DOCUMENTS

| | | | |
|---|---|---|---|
| 2015/0221959 A1* | 8/2015 | Jin | H01M 8/0273 |
| | | | 429/418 |
| 2016/0126579 A1* | 5/2016 | Darling | H01M 8/1067 |
| | | | 429/101 |
| 2017/0229715 A1* | 8/2017 | Chou | H01M 8/0258 |

* cited by examiner (a)

(b)

STORAGE MODULE OF DISTRIBUTED FLOW BATTERY

TECHNICAL FIELD OF THE INVENTION

The present invention relates to a storage module, where where low-cost materials are used, including a membrane, plasma modified carbon felts, and integrally-molded complex cast polar plates (composed of graphite plates and border plates with a new flow-field design); a bipolar plate is thinned with material cost effectively saved; and the present invention is used as a storage module in a form of combining current collectors, the graphite plates, and graphite papers to effectively improve the energy efficiency of cell stack.

DESCRIPTION OF THE RELATED ARTS

All-vanadium (V) electrolyte battery uses V ions of different valences to process redox reactions for storing or releasing electrical energy. The electrodes themselves are not involved in the reactions with positive and negative electrolytes separately stored in outside reservoirs, so that the self-discharge is low and the cycle life is long. The characteristic lies in the separate designs for the battery power and the stored energy capability.

For the design of the battery structure, some considerations include the electrolyte distributions in reaction areas and the deduction of shunt currents. The all-V battery is composed of a plurality of single cells connected in series. As being conductive, the electrolytes communicating between any two single-cells generate currents (i.e. shunt currents) owing to potential differences. These currents do not supply external loads, i.e. internal frictions. Most of the ways to reduce these shunt currents are to increase the flow length of the electrolytes from main conduit to reaction areas for increasing the impedance of this portion of electrolytes. These flow conduits are designed on a frame of insulating material, which, thereby, increases the structural complexity of the all-V battery.

In the conventional structure of the all-V battery, a bipolar plate is formed by clamping a graphite plate with two insulating frames, where the function of the graphite plate is to separate the positive and negative electrolytes and to conduct electrons with conduit branches set on the insulating frames. On assembling, the contact surface of each layer is set with airtight gasket to prevent electrolyte leakage. However, such a battery structure requires many components, where, on assembling, the cost of the battery becomes increased. Meanwhile, the conventional bipolar plate has a big size, which makes the molding of a thin bipolar plate difficult. As a result, after the assembly of the battery stack, its volume becomes large too.

Summarily saying, the bipolar plate of the conventional flow battery has a graphite plate bonded in a insulating frame; the bipolar plate in such a design comprises many components with a big size; and the assembly requires a long time. Hence, the prior arts do not fulfill all users' requests on actual use.

SUMMARY OF THE INVENTION

The main purpose of the present invention is to apply to distributed flow battery, where low-cost materials are used, including a membrane, plasma modified carbon felts, and integrally-molded complex cast polar plates (composed of graphite plates and border plates with a new flow-field design); a bipolar plate is thinned with material cost effectively saved; and the present invention is used as a storage module in a form of combining current collectors, the graphite plates, and graphite papers to effectively improve the energy efficiency of cell stack.

To achieve the above purpose, the present invention is a storage module of distributed flow battery, where an electrochemical reaction is processed with positive and negative electrolytes to generate and discharge direct current and further output the positive and negative electrolytes after the reaction; the storage module comprises two end plates, two frames, two current collectors, two complex cast polar plates, two electrodes, a membrane, and three gaskets; one of the end plates has an input connector connecting with a negative electrolyte source; and an output connector connecting back to the negative electrolyte source; and the other one of the end plates has an input connector connecting with a positive electrolyte source; and an output connector connecting back to the positive electrolyte source; the frames are obtained between the end plates and are insulating frames of plastic material; the current collectors are obtained between the frames and an end of each one of the current collectors has a graphite paper; the complex cast polar plates are obtained between the current collectors; and, through casting, a graphite plate and a border plate on the graphite plate are integrally-molded to obtain the complex cast polar plate as a unipolar plate; a surface of the graphite plate has a plurality of electrolyte flow conduits and, through the graphite paper, the current collector contacts the other surface of the graphite plate at opposite side having the electrolyte flow conduits to combine the current collector, the graphite plate, and the graphite paper; and the border plate has a plurality of conduit branches and a plurality of manifold holes and the conduit branches of the border plate guide the positive and negative electrolytes to flow in and out the graphite plate; the electrodes are obtained between the complex cast polar plates; the electrodes are a positive electrode and a negative electrode; and the electrode is made of an electrode material of plasma-modified carbon felt; the membrane is obtained between the electrodes and is made of a membrane material of polysulfone (PSF) modified through atom transfer radical polymerization (ATRP); two of the gaskets are obtained to sandwich and enclose one of the complex cast polar plates; and the other one of the gaskets is obtained between the other one of the complex cast polar plates and an adjacent one of the current collectors. Accordingly, a novel storage module is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
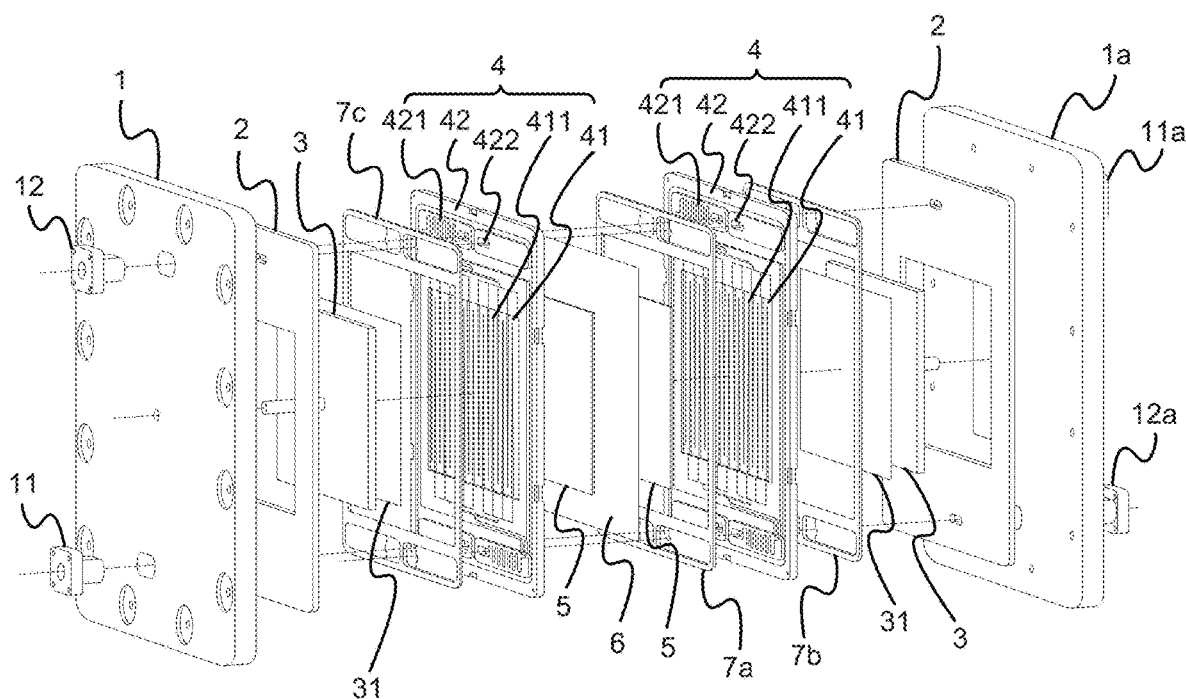
FIG. 1 is the structural view showing the preferred embodiment according to the present invention.
Figure 2:
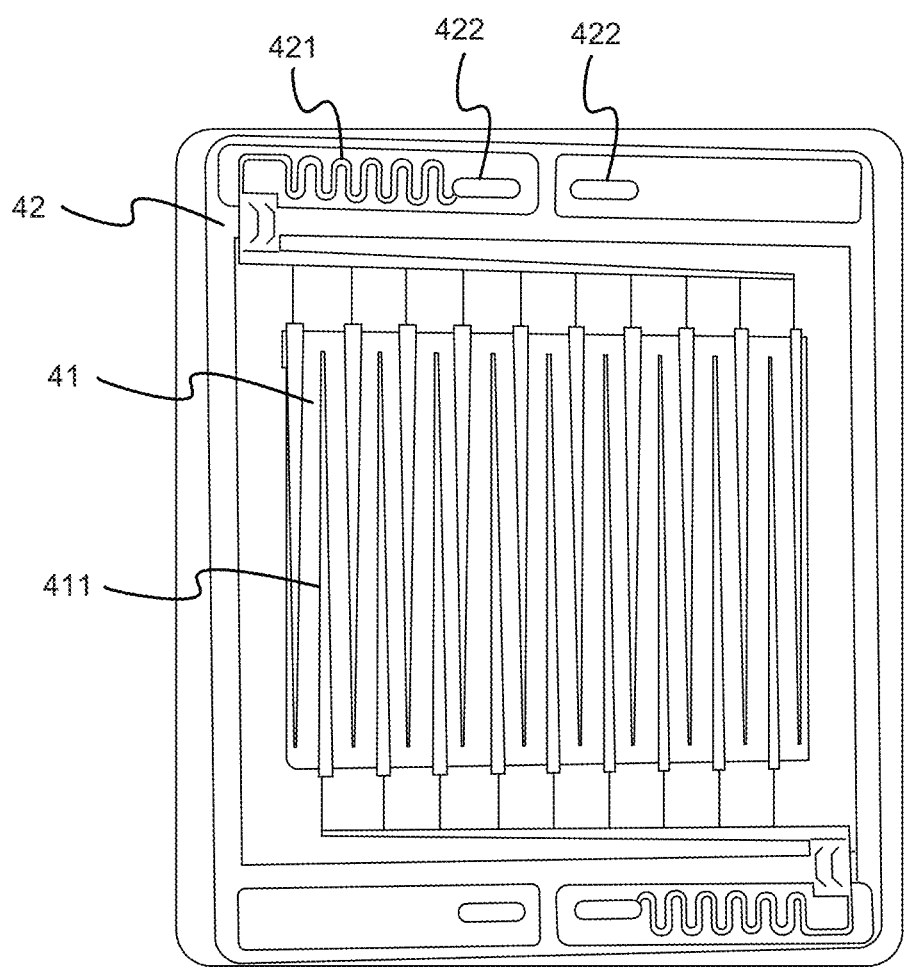
FIG. 2 is the planar view showing the complex cast polar plate.
Figure 3:
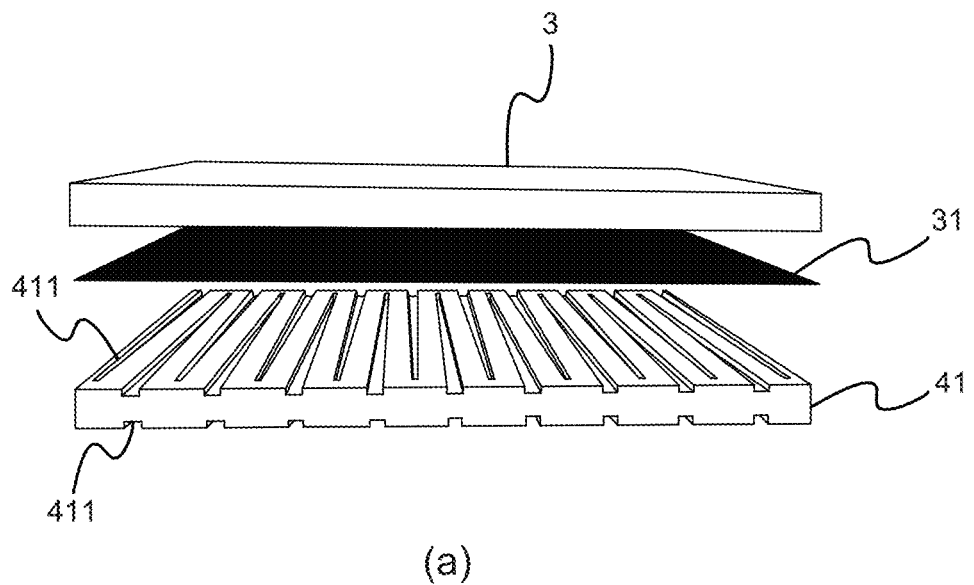
FIG. 3 is the view showing the combinations of the graphite plates and the current collectors.
Figure 3:
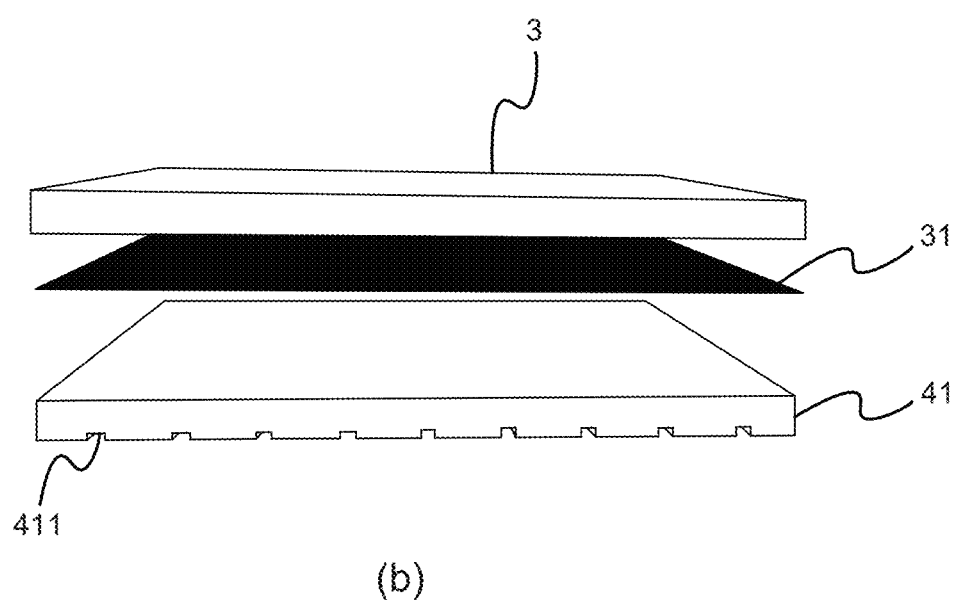
Figure 4:
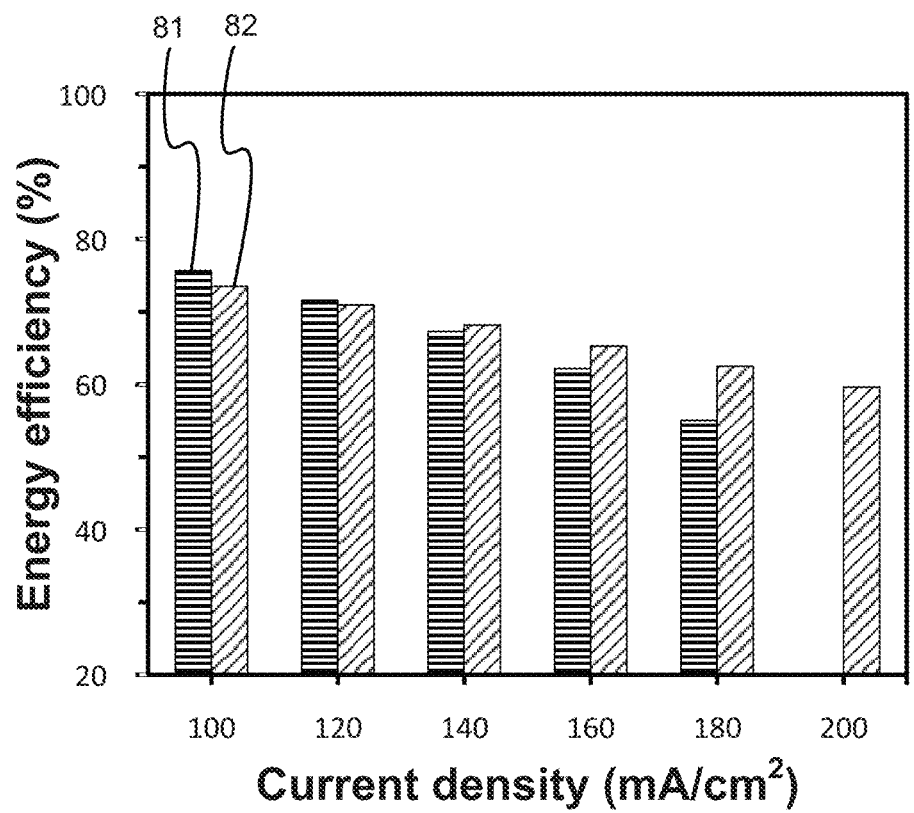
FIG. 4 is the view showing the result of optimization tests.

Please refer to FIG. 1 to FIG. 4, which are a structural view showing a preferred embodiment according to the present invention; a planar view showing a complex cast polar plate; a view showing combinations of graphite plates and current collectors; and a view showing a result of optimization tests. As shown in the figures, the present invention is a storage module of distributed flow battery, where an electrochemical reaction is processed with positive and negative electrolytes to generate and/or discharge direct current and further output the positive and negative electrolytes after the reaction. The module comprises two end plates 1,1a, two frames 2, two current collectors 3, two complex cast polar plates 4, two electrodes 5, a membrane 6, and three gaskets 7a,7b,7c.

In the end plates 1,1a, one of them 1 has an input connector 11 connecting with a negative electrolyte source and an output connector 12 connecting back to the negative electrolyte source; and the other one of them 1a has an input connector 11a connecting with a positive electrolyte source and an output connector 12a connecting back to the positive electrolyte source.

The two frames 2 are set between the end plates 1,1a and are insulating frames of plastic material.

The current collectors 3 are set between the two frames and each one of the current collectors 3 has a graphite paper 31 set at a front end.

The complex cast polar plates 4 are set between the two current collectors, where, through casting, a graphite plate 41 and a border plate 42 on the graphite plate 41 are integrally-molded; a surface of the graphite plate 41 has a plurality of electrolyte flow conduits 411; and, through the graphite paper 31, the current collector 3 contacts the graphite plate 41 to combine the current collector 3, the graphite plate 41, and the graphite paper 31. The border plate 42 is made of polyvinyl chloride (PVC), polyvinylidene fluoride (PVDF), polyethylene (PE), polypropylene (PP), polystyrene (PS), or polytetrafluoroethylene (PTFE); the border plate 42 has a plurality of conduit branches 421 and a plurality of manifold holes 422; and the conduit branches 421 of the border plate 42 guide the positive and negative electrolytes to flow in and out the graphite plate 41.

The electrodes 5 are set between the complex cast polar plates 4. The electrodes 5 are a positive electrode and a negative electrode made of an electrode material of plasma-modified carbon felt.

The membrane 6 is set between the electrodes, where the membrane 6 is fabricated by applying a coating solution of polystyrene sulfonate (PSS) to a PSF membrane characterized with pores to be modified through ATRP. The PSF membrane is made of polysulfone (PSF) or polyethersulfone (PES). A peroxide of sodium persulfate ($Na_2S_2O_8$) or potassium persulfate ($K_2S_2O_8$) is used. The peroxide containing a concentration of 0.1~5.0 wt. % of $Na_2S_2O_8$, for example, is used to replace hydrogen atoms in the PSF membrane and PSS to obtain free radicals. After a thermopolymerization reaction at 60~100 celsius degrees (° C.) for 1 to 24 hours, the PSF membrane is polymerized and cross-linked with PSS to generate and grow hydrophilic groups on the pores and surface of the PSF membrane to further obtain the membrane modified to obtain high hydrophilicity, e.g. PES-PSS or PSF-PSS.

In the gaskets 7a,7b,7c, two of them 7a,7b are set to sandwich and enclose one of the complex cast polar plates 4; and the other one of them 7c is set between the other one of the complex cast polar plates 4 and an adjacent one of the current collectors 3. Thus, a novel storage module is obtained.

The complex cast polar plate 4 can be casted into a unipolar plate or a bipolar one according to different dispositions. In a state-of-use, two surfaces of the graphite plate 41 both have a plurality of electrolyte flow conduits 411. On using this state-of-use, the combination of the current collector 3, the graphite plate 41, and the graphite paper 31 is shown in diagram (a) of FIG. 3, where the graphite plate 41 has a plurality of electrolyte flow conduits 411 on the two surfaces both. As shown in a result of optimization tests, the structure with electrolyte flow conduits set on both surfaces will make an assembled cell stack obtain a high contact resistance during operation, which is shown with the horizontal stripes 81 in FIG. 4.

In another state-of-use, only one surface of the graphite plate 41 has a plurality of electrolyte flow conduits 411, and through the graphite paper 31, the current collector 3 contacts the other surface of the graphite plate 41 at opposite side having the electrolyte flow conduits 411. On using this state-of-use, the combination of the current collector 3, the graphite plate 41, and the graphite paper 31 is shown in diagram (b) of FIG. 3. Therein, the graphite plate 41 has a plurality of electrolyte flow conduits 411 on the only one surface, which means the graphite plate 41 does not have the electrolyte flow conduits 411 on the other surface corresponding to the graphite paper 31. As shown in the result of optimization tests, the structure with electrolyte flow conduits set on only one surface has a low contact resistance and, on operating the assembled cell stack under a high current density, a high energy efficiency is still obtained, which is shown with the diagonal stripes 82 in FIG. 4.

Thus, the present invention is applied to distributed flow battery, where low-cost materials are used, including a membrane, plasma modified carbon felts, and integrally-molded complex cast polar plates (composed of graphite plates and border plates with a new flow-field design); a bipolar plate can be thinned to 0.5 millimeters (mm) with material cost effectively saved; and the present invention is used as a storage module in a form of combining current collectors, the graphite plates, and graphite papers to effectively improve the energy efficiency of cell stack.

To sum up, the present invention is a storage module of distributed flow battery, where the present invention is applied to distributed flow battery; low-cost materials are used, including a membrane, plasma modified carbon felts, and integrally-molded complex cast polar plates (composed of graphite plates and border plates with a new flow-field design); a bipolar plate is thinned with material cost effectively saved; and the present invention is used as a storage module in a form of combining current collectors, the graphite plates, and graphite papers to effectively improve the energy efficiency of cell stack.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A storage module of a distributed flow battery, wherein an electrochemical reaction is processed with positive and negative electrolytes to generate and discharge direct current and further output said positive and negative electrolytes after said reaction and wherein said storage module comprises:

two end plates, wherein one of said end plates has an input connector connecting with a negative electrolyte source and an output connector connecting back to said negative electrolyte source and the other one of said end plates has an input connector connecting with a positive electrolyte source and an output connector connecting back to said positive electrolyte source;

two insulating frames of plastic material arranged between said end plates;

two current collectors, arranged between said frames and wherein an end of each one of said current collectors has a graphite paper;

two complex cast polar plates arranged between said current collectors and each comprising a graphite plate and a border plate integrally-molded on said respective graphite plate as a unipolar plate, wherein a surface of each said graphite plate has a plurality of electrolyte flow conduits and wherein, through said graphite paper, each said current collector contacts the other surface of said respective graphite plate at an opposite side having said electrolyte flow conduits so as to combine said current collector, said graphite plate, and said graphite paper; and wherein said border plate has a plurality of conduit branches and a plurality of manifold holes and said conduit branches of said border plate guide said positive and negative electrolytes to flow in and out said graphite plate;

a positive electrode and a negative electrode, each electrode made of plasma-modified carbon felt and arranged between the complex cast polar plates;

a membrane arranged between said electrodes and made of a membrane material of polysulfone (PSF) modified through atom transfer radical polymerization (ATRP); and three gaskets, wherein two of said gaskets sandwich and enclose one of said complex cast polar plates and the other one of said gaskets is arranged between the other one of said complex cast polar plates and an adjacent one of said current collectors.

2. The storage module according to claim 1, wherein each said graphite plate has a thickness of at most 0.5 millimeters (mm).

3. The storage module according to claim 1, wherein said border plate is made of a material selected from a group consisting of polyvinyl chloride (PVC), polyvinylidene fluoride (PVDF), polyethylene (PE), polypropylene (PP), polystyrene (PS), and polytetrafluoroethylene (PTFE).

4. The storage module according to claim 1, wherein said membrane is fabricated through the following steps: (a) a coating solution of polystyrene sulfonate (PSS) is applied to a PSF membrane characterized with pores to be modified through ATRP; (b) a peroxide is used to replace hydrogen atoms in said PSF membrane and PSS to obtain free radicals; and, (c) after processing a thermopolymerization reaction, said PSF membrane is polymerized and cross-linked with PSS to generate and grow hydrophilic groups on said pores and surface of said PSF membrane to further obtain said membrane modified to obtain high hydrophilicity.

5. The storage module according to claim 4, wherein said PSF membrane is made of a material selected from a group consisting of polysulfone (PSF) and polyethersulfone (PES); and said PSF membrane is a membrane of a material selected from a group consisting of PES-PSS and PSF-PSS and is modified through ATRP.

6. The storage module according to claim 4, wherein said peroxide is selected from a group consisting of sodium persulfate ($Na_2S_2O_8$) and potassium persulfate ($K_2S_2O_8$).

7. The storage module according to claim 4, wherein said hydrophilic groups are sulfonate groups ($SO_3{-}$).

* * * * *